Patented Oct. 10, 1933

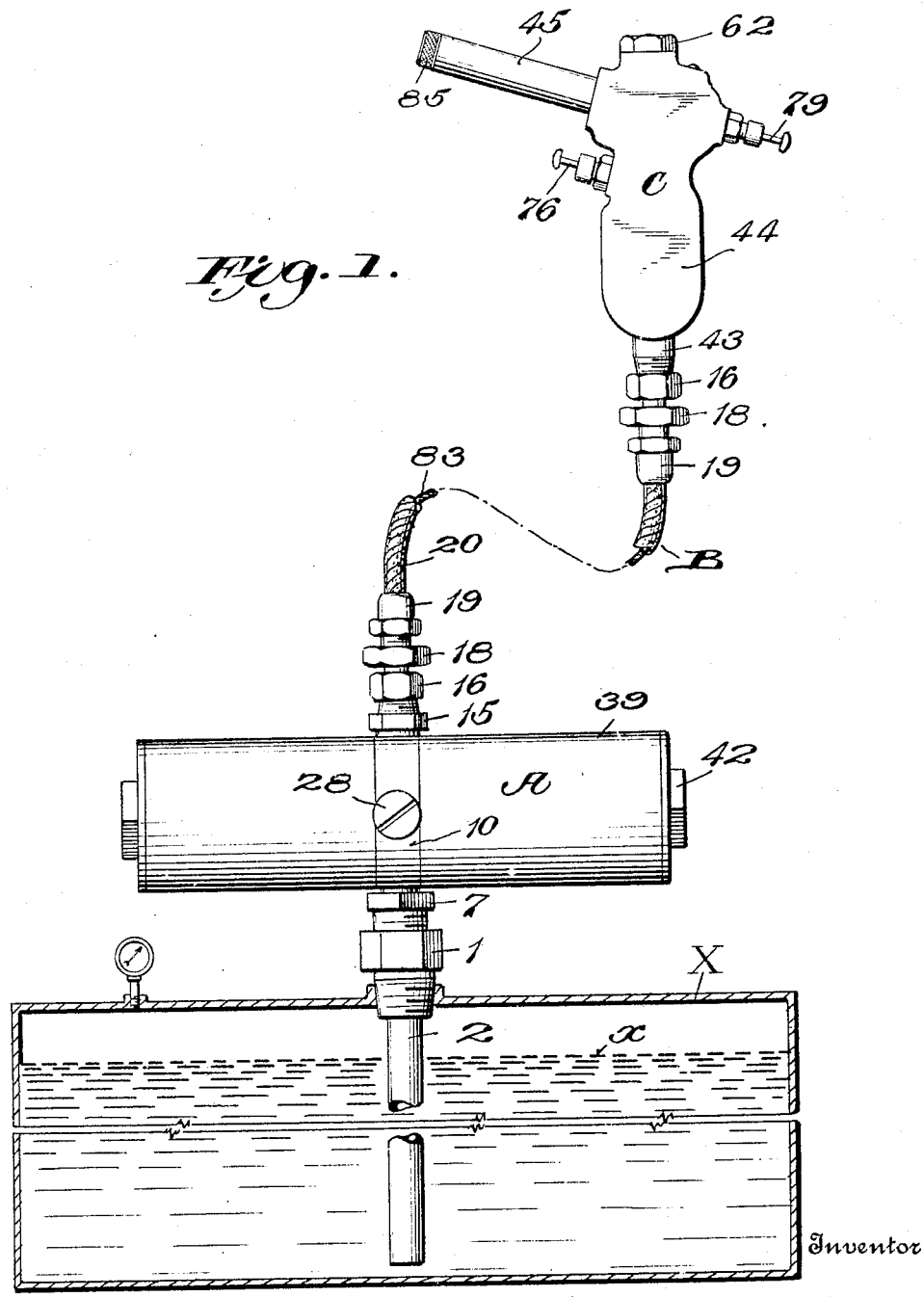

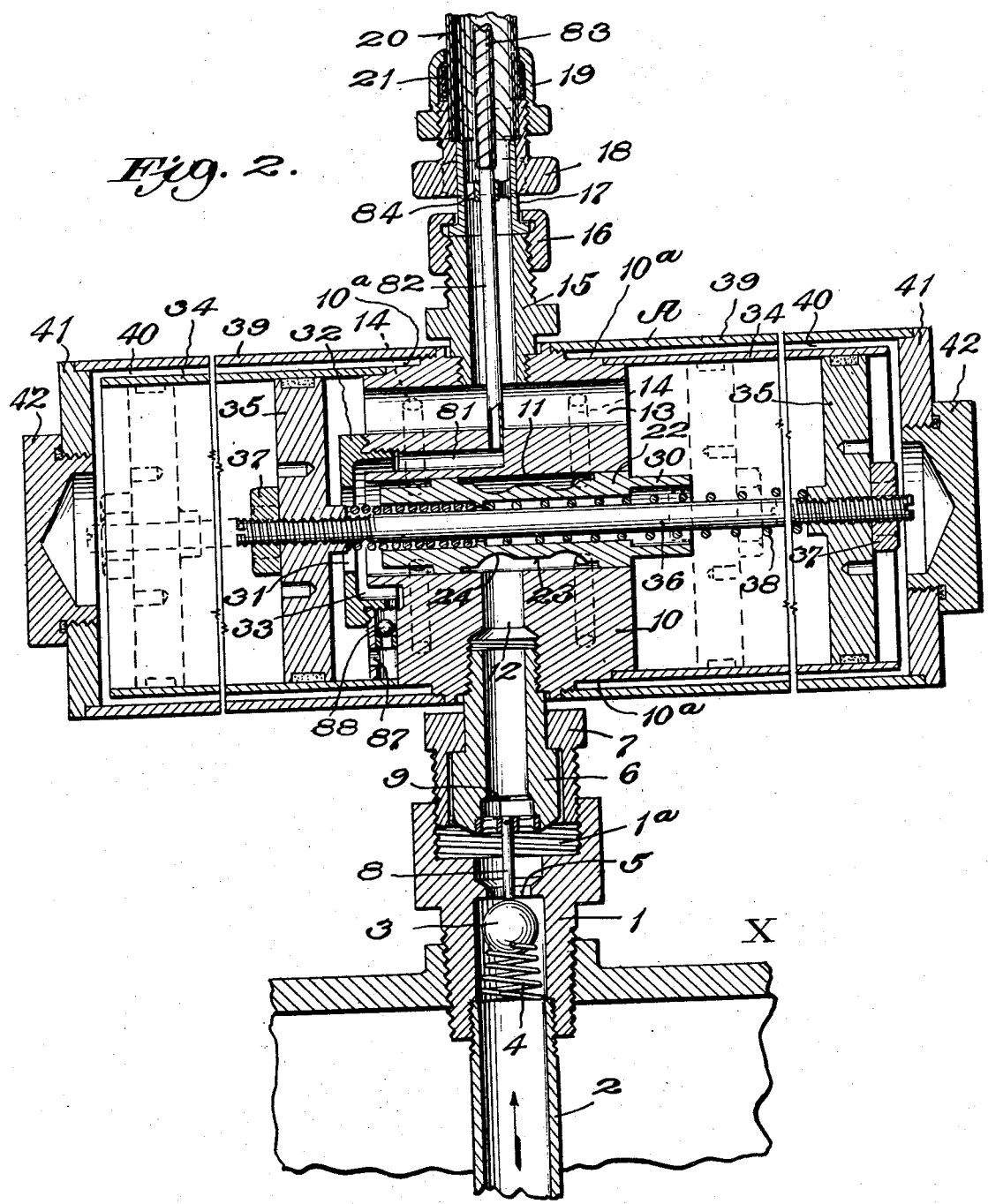

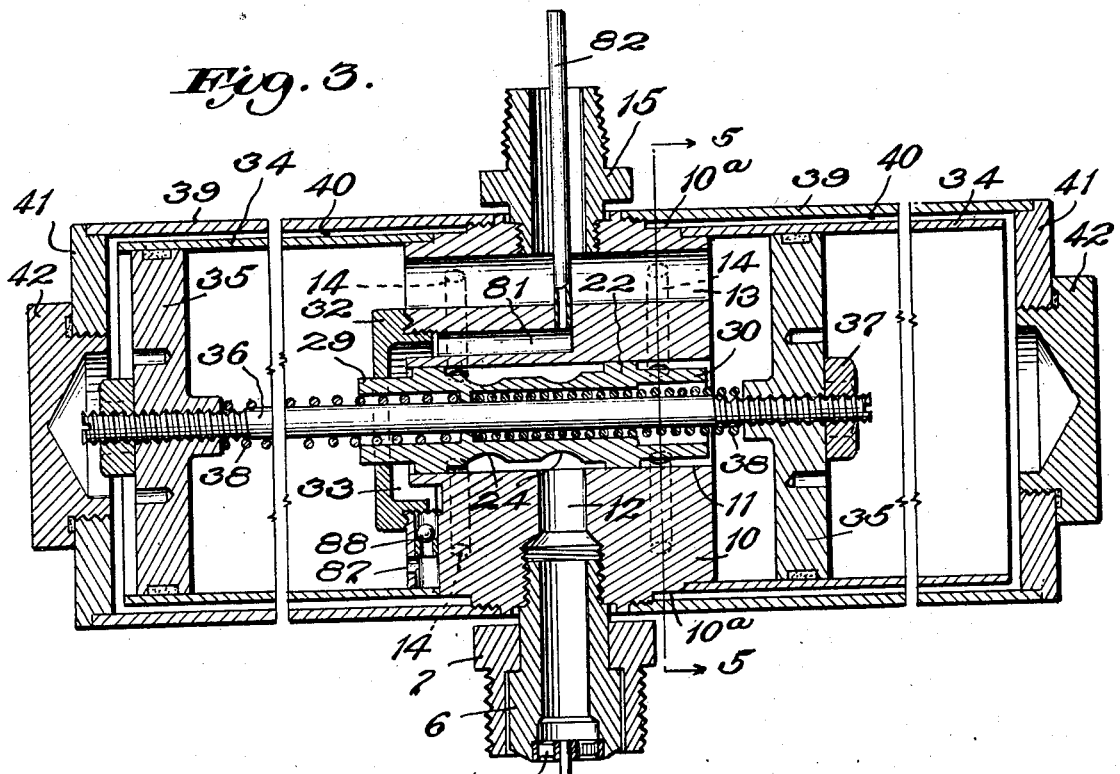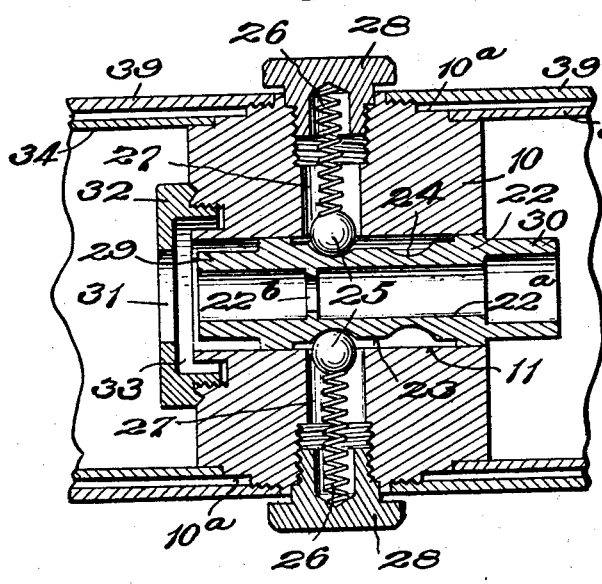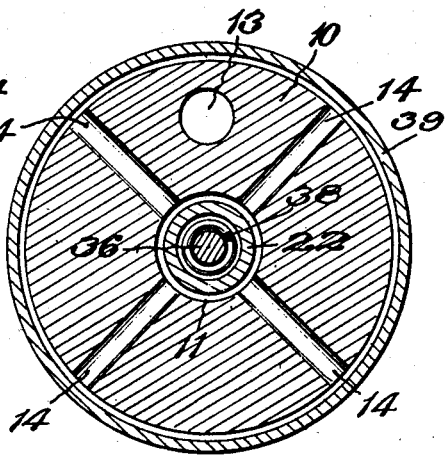

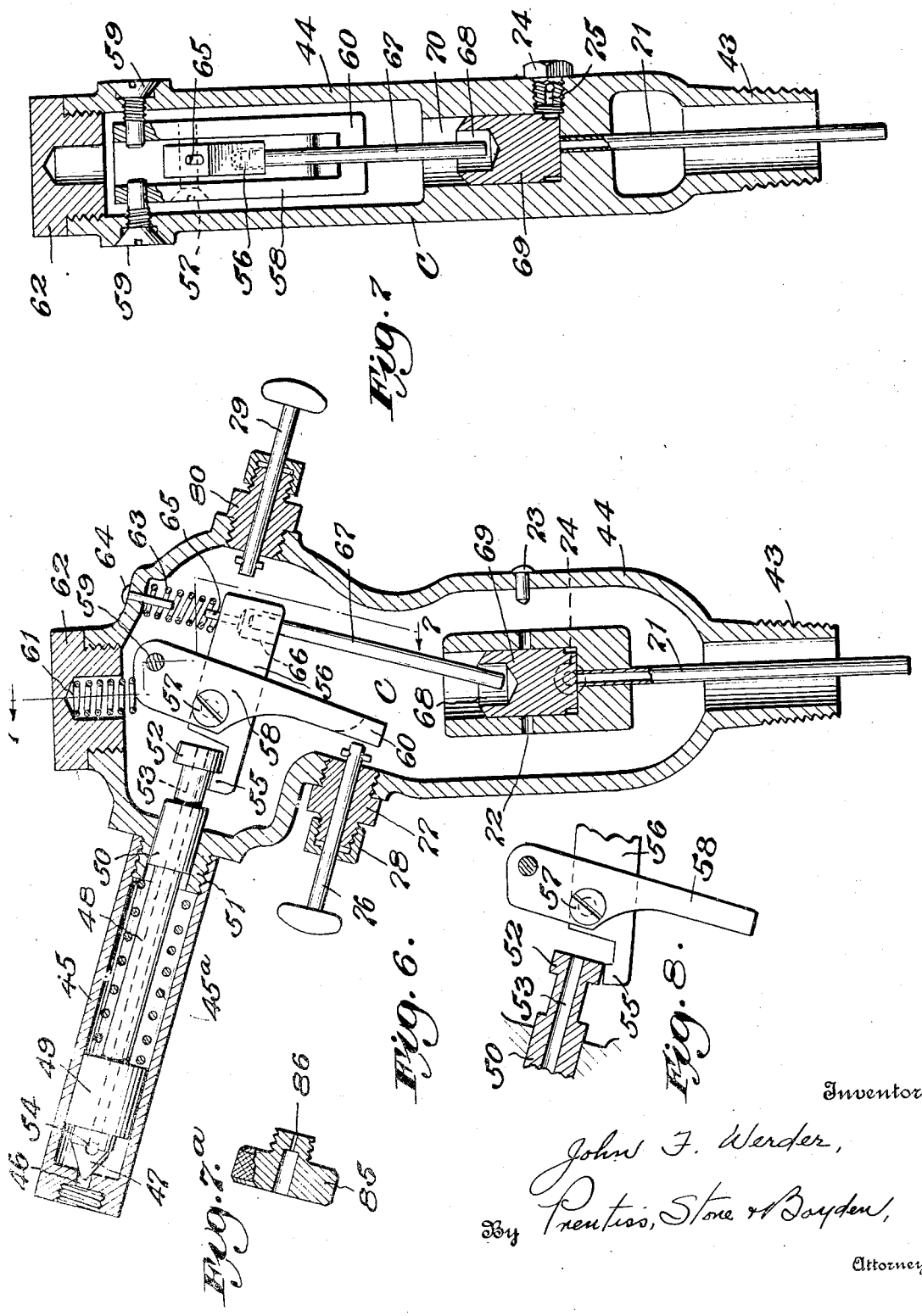

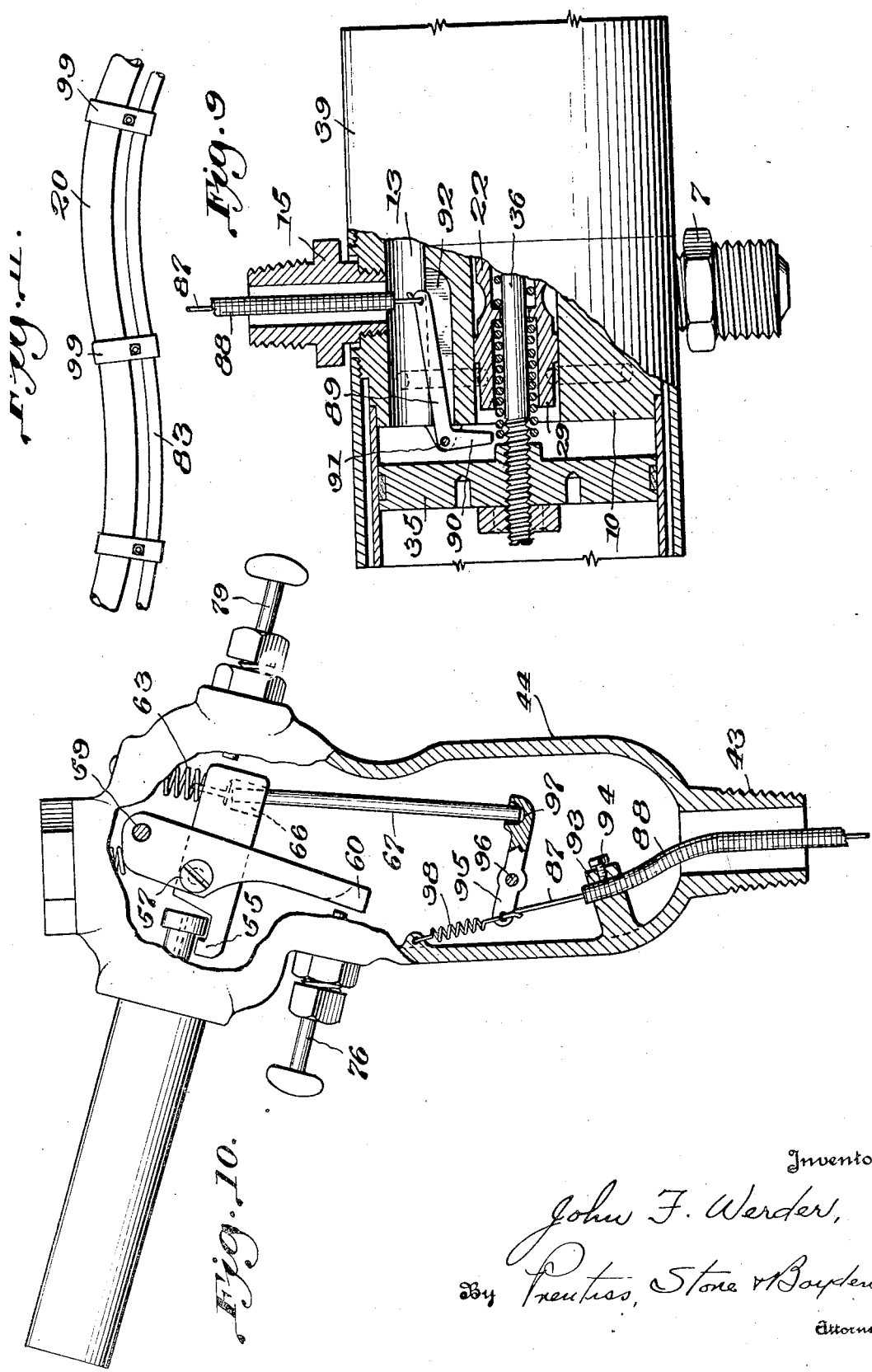

1,929,719

UNITED STATES PATENT OFFICE 1,929,719

LIQUID METERING AND DISPENSING APPARATUS

John F. Werder, Cleveland, Ohio, assignor of one-half to Edmund Rogers

Application January 11, 1928. Serial No. 245,945

38 Claims. (Cl. 221—101)

This invention relates to liquid dispensing apparatus and more particularly to devices for delivering measured quantities of a liquid under pressure from a nozzle or the like.

While capable of other uses, the invention is particularly designed for use at filling stations for delivering to automobiles measured quantities of oil, gasoline, alcohol, and the like.

A leading object of the invention is to provide apparatus comprising a metering device to which is attached a flexible hose having a delivery nozzle at its end, combined with means whereby a valve at the nozzle is automatically controlled by the operation of the metering device. Means are provided for manually opening the nozzle valve to initiate the flow of liquid therethrough and, after a predetermined amount of liquid has been delivered, the valve is automatically closed by the operation of the metering device. Thus the entire hose line is maintained full of liquid under pressure, and when the valve is opened, there is delivered from the nozzle exactly the same amount of liquid that passes through the metering device.

Another object of the invention is to provide measuring and dispensing apparatus including a meter, and delivery nozzle or gun, and a hose line, all of which may be connected as a unit to a closed tank containing the liquid under pressure, and, when the tank is empty, disconnected therefrom.

A further object is to provide an improved construction of gun or nozzle controlling means.

A still further object of the invention is to provide an improved construction of metering device having novel fluid pressure means for actuating the controlling valve at the nozzle.

With the above and other objects in view, and to improve generally upon the details of construction of such apparatus, the invention consists in the combination and arrangement of parts hereinafter described and claimed, and shown, by way of illustration, in the accompanying drawings, forming part of this specification, and in which:

Fig. 1 is a general assembly showing my improved metering device and delivery nozzle connected to a pressure tank containing liquid, parts being shown in section and parts being broken away;

Fig. 2 is a vertical, longitudinal section on an enlarged scale through my improved metering device, a portion of the tank being also illustrated in order to show the method of connecting the metering device thereto;

Fig. 3 is a view similar to Fig. 2, but showing the parts in a different position, some of the parts illustrated in Fig. 2 being omitted;

Fig. 4 is a fragmentary, longitudinal section through the central portion of my improved metering device on a plane at right angles to the plane of Figs. 2 and 3, parts being omitted for the sake of clearness;

Fig. 5 is a transverse section on the line 5—5 of Fig. 3, looking in the direction of the arrows;

Fig. 6 is a central longitudinal section through my improved delivery nozzle or gun, parts being shown in elevation;

Fig. 7 is a transverse section through the same, the upper portion being taken substantially on the line 7—7 of Fig. 6, looking in the direction of the arrows, and the lower part being on a central plane;

Fig. 7ª is a view partially in section and partially in side elevation showing a spray nozzle which may be attached to the end of the delivery gun, when desired;

Fig. 8 is a fragmentary view, partially in section and partially in side elevation, showing certain of the parts included in Fig. 6, and illustrating such parts in a different position;

Fig. 9 is a fragmentary view, partly in section and partly in elevation, generally similar to Fig. 2, but showing a modified construction;

Fig. 10 is a view similar to Fig. 6, but partly in elevation, showing a modified arrangement of gun for use in connection with the construction of meter illustrated in Fig. 9; and Fig. 11 is a fragmentary elevation, showing a modified arrangement of hose.

Referring to the drawings in detail and first more particularly to Fig. 1, my improved dispensing apparatus comprises a metering device A and flexible hose B connected thereto, and a delivery gun or nozzle C secured to the free end of the hose. The metering device is mounted upon and supported by a suitable tank X containing a liquid under pressure, as indicated at $x$. This pressure may be due to compressed air delivered into the space above the level of the liquid $x$ or it may be generated by a gas, such as carbon dioxide, dissolved or absorbed in the liquid itself, as fully set forth in my prior copending application, Serial No. 103,352, filed April 20, 1926.

Referring now to Fig. 2, it will be seen that the tank X is provided with an outlet fitting or connection 1, having at its outer end a socket 1ª to receive the meter attaching coupling. To the lower end of the fitting 1 is secured a pipe 2 which extends downwardly into the tank to a point near the bottom thereof. The tank is normally closed by a check valve 3, shown as in the form of a ball, supported on a spring 4 and adapted to seat upon the lower side of an annular shoulder 5 formed in the fitting 1. Thus when the ball 3 is depressed, the outlet pipe 2 leading from the tank is opened and the liquid can flow out.

A coupling member or plug 6 is screwed into one side of the metering device and is surrounded by an annular slip nut 7, which is adapted to engage internal threads in the socket 1ª. In the outer end of the coupling member 6 is secured a spider 9 rigidly carrying an axially extending pin 8. It will thus be seen that when the coupling 6, 7 is applied to the socket 1ª and the slip nut screwed down, the pin 8 engages and depresses the ball 3, thus moving it from its seat and opening a passage establishing communication between the pipe 2 and the interior of the metering device.

The metering device itself preferably comprises a central block 10 with measuring chambers or cylinders arranged at each side thereof, as hereinafter described. This block 10, which is shown as cylindrical, is provided with an axial bore 11, and with a transverse bore or port 12 tapping the bore 11 at its middle point and establishing communication between such bore and the interior of the coupling member 6.

The block 10 is also provided at one side of its center with a longitudinally extending bore or passage 13, as clearly shown in Figs. 2 and 5. The block is also formed at each side of its center with a group of radially disposed ports 14 extending outward from the central bore 11, as clearly shown in Figs. 2, 3, and 5, four of such ports being shown as making up each group. The end portions of the cylindrical block 10 are somewhat reduced in diameter, as indicated at 10ª in Fig. 2, and the ends of the radial ports 14 terminate at the surface of these reduced portions.

Set into the block 10, preferably at a point diametrically opposite the coupling member 6, and tapping the longitudinal bore 13 is a fitting or coupling member 15 constituting the outlet or exit passage from the meter. This member is in the form of a plug and has associated with the outer end thereof an annular slip nut 16 embracing a radial flange on another coupling member comprising the parts 17, 18 brazed together with the slip nut 16 assembled thereon. The outer end of the member 18 is recessed and externally screw threaded. One end of a flexible hose 20 is set in this recess and may be secured therein in any suitable manner. As illustrated, the hose 20 is preferably of the spiral wound strip type, and is shown as being bound with wire 21 which is embraced by a coupling sleeve 19 adapted to screw over the threaded end of the member 18. As this type of hose connection is well known in the art, it need not be further discussed here.

Sliding freely with a snug fit in the central bore 11 of the block 10 is a spool valve 22 provided with a pair of annular rounded grooves 24 separated by a central annular shoulder 23. The grooves 24 constitute seats in which a pair of balls 25 rest, as shown in Fig. 4, these balls being resiliently pressed against opposite sides of the valve by means of compression springs 26 enclosed within chambers 27 in the block 10 and held in position by screw plugs 28. It will thus be seen that these resiliently pressed balls serve as detents to yieldingly hold the spool valve in either one of two positions, and to permit such valve to snap from one position to the other as the balls ride over the central shoulder 23. At the ends of the spool valve are annular axially extending flanges 29 and 30, one of these flanges projecting from the respective ends of the block 10 in each position of the valve. The face of the block 10 adjacent the flange 29 is bored out to receive a cap or cup member 32 having in its end an opening 31 disposed in axial alignment with the valve and of such size as to permit the flange 29 to pass freely but snugly through the same, as shown in Fig. 3. Thus when the flange 29 enters and closes opening 31, a closed chamber or pocket 33 is formed within the cap or cup member 32, the purpose of which will be hereinafter described.

Secured to each end of the block 10 and preferably recessed thereon is a cylinder 34 having an open outer end. The outer surface of these cylinders is substantially flush with the outer surface of the reduced portions 10ª of the block 10, as clearly shown in Fig. 2. Working snugly in the cylinders 34 are a pair of pistons 35, adjustably secured to the ends of a piston rod 36 and held in adjusted position by means of lock nuts 37. The piston rod 36 extends through a central bore 22ª in the spool valve 22 (see Fig. 4), such bore being considerably larger than the rod so as to provide space for the accommodation of helical compression springs 38, which surround the rod 36. These springs bear at their outer ends against the pistons 35, and at their inner ends against an internal annular shoulder 22ᵇ (see Fig. 4), formed in the bore 22ª of the valve. Thus when one of these springs is compressed, it exerts a pressure on the valve tending to shift the same axially, the other spring being at the same time in its expanded condition.

Secured to each end of the block 10 outside of the cylinder 34 is a cylindrical shell 39. These shells have an internal diameter somewhat greater than the external diameter of the cylinders 34, so that when in position they provide an annular space or passageway 40 between themselves and the cylinders 34, and it will be observed that the radial ports 14 communicate with such passageway. The outer ends of the cylindrical shells 39 are closed as by means of end plates 41 preferably provided with removable central plugs 42, to render the lock nuts 37 accessible, the inner surface of the end plates 41 being spaced somewhat from the ends of the cylinders 34 so as to provide passageways connecting the annular spaces 40 with the interior of the cylinders 34.

As illustrated in Fig. 1, the free end of the hose B is connected with a delivery nozzle or gun C. The method of connection which I preferably employ is the same as that illustrated in detail in Fig. 2, namely the connection includes coupling members 16, 18 and 19, assembled as shown, the member 16 engaging over the threaded end of a nipple 43 carried by the nozzle or gun.

Referring now to Figs. 6-8, inclusive. I have illustrated in detail the construction of this gun. It consists of a relatively flat body 44 preferably formed of cast metal, and having, at the end remote from the hose connection, a laterally extending barrel or nozzle, proper, 45. The entire device is preferably of a size to be conveniently grasped in the hand, after the manner of a pistol.

At the extreme end of the barrel or nozzle 45 is a delivery port 46 normally closed by a conical valve 47 carried by a valve stem 48. This is provided with enlarged portions 49 and 50 adapted to slide freely in the barrel 45 and a bushing 51 respectively, on which bushing the barrel 45 is screwed. The valve stem 48 projects into the interior of the body 44 of the gun and carries at its inner end an enlarged annular head 52. The valve stem is hollow, that is to say it is provided with a bore or passage 53 extending longitudinally thereof, one end opening through the head 52, and the other end communicating with a transverse port 54 adjacent the delivery port 46. Thus liquid entering the interior of the body 44 may pass freely out through the hollow valve stem and port 54 to the delivery port 46. Moreover, by providing the enlarged portions 49 and 50 with longitudinal grooves or openings the liquid can flow freely into the interior of the barrel 45, thus constituting an additional path by which liquid may flow to the delivery port 46. This, however, is a matter of choice.

Adapted to engage over the annular head 52 is a hook or catch 55 carried by a member 56. This is pivoted at 57 between the arms of a swinging yoke member 58, itself pivoted at 59 to the body 44. A compression spring 61 received in a removable plug 62 set into the upper end of the body 44 bears upon the yoke 58 at a point to one side of its pivot 59, and thus tends to swing such yoke about its pivot and in a direction to move the catch member 56 rearwardly or away from the barrel 45.

Another spring 63 bears at one end against the casing or body 44, being held in position by a pin 64, and at the other end, upon the tail of the catch member 56, being held in position by a pin 65 carried thereby. The action of this spring 63 is to tend to turn the catch member 56 about its pivot 57 in such a direction as to cause the hook or catch 55 to engage behind the head 52, as shown in Fig. 6.

In the under side of the catch member 56, opposite the spring 63 is formed a recess or pocket 66, in which recess is loosely reecived the upper end of a short rod 67. The lower end of this rod rests loosely in a similar recess or pocket 68 formed in the upper end of a small piston 69 mounted to reciprocate in a cylinder 70. From the lower end of this cylinder extends a small tube 71 through the center of the hose connection 43, the purpose of which will be hereinafter described.

Transverse ports 72 are formed in the walls of the cylinder 70, and for this purpose it is necessary to drill through the casing 44, the hole thus formed being closed by a pin 73. The purpose of the ports 72 is to limit the upward movement of the piston 69, since, as is obvious, when the bottom of the piston reaches these ports, any motive fluid below the same is immediately exhausted.

In order to permit the piston 69 and associated parts to return by gravity to the position shown in the drawings after each actuation thereof by fluid pressure, as hereinafter described, a plug 74, having longitudinal and transverse bleed ports 75, is set into the wall of the cylinder 70 at the bottom thereof, in order to permit the pressure fluid to leak away.
A manually operated push button or plunger 76 is slidably mounted in a bushing 77 set into the wall of the casing 44 at a point adjacent the lower end of the yoke 58, a suitable packing gland 78 surrounding the plunger in order to prevent the escape of liquid. The inner end of this plunger 76 is arranged to engage the lower end 60 of the swinging yoke 58, and when the plunger is manually operated, it will be seen that the plunger 58 is swung upon its pivot 59, thus moving the catch member 56, and with it the valve stem 48 toward the right, thereby unseating the valve 47 and opening the port 46. A spring 45$^a$ surrounds the valve stem 48 within the barrel 45 and bears at its ends against the enlargement 49 and the bushing 51 respectively. This spring therefore tends to maintain the valve 47 closed. When the plunger 76 is actuated and the valve 47 opened as described, the spring 45$^a$ is compressed, and it is necessary for the operator to maintain pressure on the plunger 76 in order to hold the valve open. In this connection, it will be understood that the spring 45$^a$ is much stronger than the spring 61 so that the latter is, of course, not able to force the valve open.

At the rear side of the body or casing 44 in substantial alignment with the valve stem 48 is slidably mounted in a suitable bushing 80 another manually operable plunger 79. The inner end of this plunger is arranged to engage the end of the catch member 56 for the purpose hereinafter described.

Referring again to Fig. 2, it will be seen that I provide a passage 81 in the block 10 communicating with the chamber or pocket 33 and that, set into the block 10 and tapping the passage 81 is a small tube 82. This tube extends up centrally through the fitting or coupling member 15 and is held in position therein by means of a spider 84, illustrated as being carried by the member 17.

To the upper end of the tube 82 is secured one end of a small flexible control conduit 83. This conduit or hose is also preferably of the spiral wound strip type and is secured to the end of the tube 82, which may be of steel or the like, as by brazing or soldering.

The conduit or hose 83 extends from the tube 82 on through the main conduit or hose 20, as clearly illustrated in Figs. 1 and 2, and is similarly secured at its other end to the metal tube 71 connected with the cylinder 70 of the gun.

The operation of the apparatus as a whole will now be briefly described. The tank X having been previously filled with either a gas-charged liquid or containing a liquid and connected with a source of compressed air, the metering device is mounted upon the tank by means of the coupling members 1, 6, and 7, as described. The pressure then forces the liquid from the tank up through the pipe 2 and port 12 into and through the metering device A, hose line B, and gun C. Assuming that the entire apparatus has been filled with liquid, as described, and that it is desired to deliver or dispense a measured quantity of such liquid to a customer, the attendant grasps the gun C, directs the nozzle 45 as desired, and depresses the plunger or trigger 76. This, as above described, opens the valve 47 and liquid then flows from the tank as follows. Assuming that the pistons 35 and spool valve 22 are in the positions shown in Fig. 2, liquid flows from the inlet port 12 around the spool valve out through the radial ports 14 at the right, into the annular passage

40, and thence around the end of the cylinder 34, where it acts against the outer face of the right-hand piston 35, thus forcing the pistons toward the left. Meanwhile liquid which has previously filled the interior of the right-hand cylinder 34 between the piston 35 and block 10 is forced out through the passage 13 and coupling members 15, 16, 17 and 18, into and through the hose 20, into and through the body 44 of the gun, and thence out through the hollow valve stem 48 and delivery port 46. As the pistons move toward the left, as described, the liquid which had previously filled the cylinder 34 at the outside of the left-hand piston 35 is forced out of such cylinder through the annular space 40, left-hand radial ports 14, and thence through the chamber 33 and opening 31 into the cylinder on the inside of the left-hand piston 35. In other words, the liquid in this left-hand cylinder is simply transferred from the outside of the piston to the inside thereof, this operation being merely an idle or incidental one. The same action occurs during the next stroke in the right-hand cylinder. In other words, it is only the piston which, at any given moment, is moving toward the block 10, that forces the liquid out through the exit passage, so that for each half cycle of the piston movement only the contents of one cylinder 34 is delivered. This cylinder may be of such a size as to contain a pint, quart, or other desired quantity, and the accuracy of the measurement can be insured by properly adjusting the pistons on the piston rod.

As the right-hand piston 35 continues to move toward the left, as described, it reaches the position shown in dotted lines in Fig. 2, in which position its inner face engages the outer end of the flange 30 carried by the spool valve. Furthermore, as this piston travels toward the left, it gradually compresses the spring 38 between itself and the shoulder 22$^b$ on the spool valve, but the strength of this spring is so proportioned relative to the strength of the springs 26 (see Fig. 4) that the maximum pressure exerted by the spring 38 is not quite sufficient to overcome the friction of the balls 25. The spool valve 22 therefore remains in the position shown in Fig. 2 until the piston reaches the position shown in dotted lines. The next increment of movement of the piston toward the left results in the valve 22 being carried along with the piston, and in the balls 25 beginning to ride up out of the groove 24. The strength of the springs is so proportioned that all that is required is that the movement of the spool valve be initiated by engagement with the piston, as described. Immediately that the movement of the spool valve is started, by the impact of the piston, the friction of the balls 25 is overcome, and the spring 38 completes the movement of the valve 22, causing such valve to snap suddenly from the position shown in Fig. 2 to that shown in Fig. 3. This change in the position of the valve, as will be seen from an inspection of the drawings, has the effect of disconnecting the right-hand ports 14 from the supply passage 12 and connecting the left-hand ports 14 with such passage, thus reversing the action of the pistons, so that, if the valve 47 remained open, such pistons would begin their return stroke.

However, as the valve 22 snaps over, as described, the flange 29 enters and substantially closes the opening 31, thus trapping a certain amount of liquid in the chamber 33. The opening 31 is closed, and the liquid thus trapped, as soon as the end of the flange 39 enters the opening 31. By reference to Fig. 3, it will be seen that the flange 39 travels a considerable distance through the opening 31, and it will therefore be understood that during the last portion of the movement of the valve, the liquid trapped in the chamber 33 is subjected to a sharp increase in pressure. There is practically no escape for the liquid from the chamber 33, except through the port 81, tube 82 and flexible conduit 83. Accordingly, a pressure impulse is transmitted through this tube and conduit and through the tube 71 at the other end of the hose, into the bottom of the cylinder 70. In other words, a small volume of liquid under relatively high pressure is momentarily forced or squirted through the tubes and conduit into the cylinder 70 and exerts a force beneath the piston 69 sufficient to raise the same. The rising of this piston 69 operates through the push rod 67 to swing the catch member 56 about its pivot 57, thus disengaging the hook or catch 55 from the head 52 of the valve stem, and permitting the spring 45$^a$ to close the valve 47. It will thus be seen that as the right-hand piston 35 completes its stroke, the spool valve is shifted, and in shifting, generates a power impulse which is transmitted to the delivery nozzle, and which serves to automatically close the valve which had been previously manually opened. When the valve 47 closes, further movement of the parts of the metering device, of course, immediately ceases, but such parts are left in a position, as illustrated in Fig. 3, ready for a new operation in the opposite direction, when the valve 47 is again opened. As the chamber 33 is provided at only one end of the spool valve, it is obvious that the pistons will execute a complete cycle at each actuation of the plunger 76.

However, the operator cannot again open this valve by mere pressure upon the plunger or push trigger 76. When the hook 55 was disengaged from the head 52, as above mentioned, the spring 61 served to swing the yoke 58 about its pivot 59 into a position such as illustrated in Fig. 8. From an inspection of this figure it will be seen that even after the pressure impulse has been expended and the piston 69 has returned to its normal position, the hook 55 will not again engage behind the head 52, but will remain resting upon the side of such head. Before the valve can be again opened by operation of the plunger 76, it is necessary for the operator to manipulate the restoring or resetting plunger 79. By pushing this plunger, the catch member 56 may be shifted to the left until the hook 55, urged by the spring 63, will again snap over and engage the head 52. Thereupon the valve 47 can be again opened by actuating the plunger 76. I make it necessary to employ a resetting plunger in order to insure that delivery of liquid will cease after each stroke of the metering device, and that the operator cannot, by careless handling of the plunger 76, immediately reopen the valve without knowledge that the metering device has operated. By making it necessary for the operator to reset the apparatus by means of a separate restoring plunger, the fact that the meter has operated and tripped the valve is unavoidably brought to his attention.

Furthermore, it will be particularly noted that my improved metering device can not reverse or run backward. This will be clear from an inspection of Fig. 2, from which it is obvious that any tendency of the liquid to flow back toward the tank results in applying pressure through the port 13 simultaneously to the inside of both pistons 35. It is impossible, therefore, for any back pressure, no matter how great, to move the pistons.

Referring once more to Figs. 2 and 3, it will be seen that when the valve 22 begins to move from the position shown in Fig. 3, it would tend to create a vacuum in the chamber 33. It has been found in practice that where a gas-charged liquid under pressure is employed, this tendency to form a vacuum results in gas being given off or liberated, and this is highly objectionable, as it destroys the accuracy of the measurements. In order to avoid this, I provide a passage 87 establishing communication between the chamber 33 and the interior of the cylinder 34 and control this passage by means of an inwardly opening check valve 88. This, as is obvious, will prevent any reduction of pressure in the chamber 33 as the valve moves toward the right.

Whereas in many cases, it is desired to deliver the liquid from the port 46 in a solid stream, there are some cases, as for example in applying lubricant to the springs of vehicles, where it is desired to produce a fine spray. For this purpose I provide a special spray attachment, as shown in Fig. 7a, this comprising a plug 85 adapted to be screwed into the end of the nozzle 45 and having a relatively small aperture 86 through which the liquid is sprayed.

While I have illustrated and described the invention as particularly adapted for dispensing fuel and oils at automobile service stations and the like, it also has its advantages when employed as a filling machine for packaging liquids. Thus the nozzle may be applied to a receptacle to be filled, the valve manually opened, and, when a measured quantity of liquid has been delivered into the receptacle, the valve will be automatically closed.

While I have illustrated and described above novel fluid pressure means for transmitting power from the metering device to the nozzle to actuate the valve thereof, it will be understood that the invention, in its broader aspects, is not limited to the use of such fluid pressure means, as I also contemplate using a Bowden wire for transmitting the power, where circumstances will permit. This is illustrated in Figs. 9 and 10. The Bowden wire 87, enclosed in the usual flexible case 88, may be connected to one end of a bell-crank lever 89—90, pivoted at 91 to the block 10, a slot 92 being formed in the block below the passage 13 to receive it. The end 91 of this bell-crank lever is disposed in the path of movement of the end 29 of the valve member 22. When, therefore, the valve moves to the left, its end 29 engages the bell-crank lever, rocking it on its pivot, and pulling down the wire 87. At the gun end of the hose, the casing 88 may be secured to an anchoring lug 93, by means of a clamping screw 94. The wire 87 is secured to one end of a lever 95, pivoted in the gun at 96, and having at its other end a cup 97 in which the lower end of the rod 67 rests. The wire may be retracted by a spring 98, arranged as shown. It is obvious that when the wire 87 is pulled, the rod 67 will be pushed upwardly, thus releasing the catch 55, as before. Such Bowden wire will operate satisfactorily where the delivery pipe or conduit is rigid, or, if a flexible hose, where it is relatively short. For long lengths of hose, however, in which many bends and turns are likely to occur, I find that my improved fluid pressure means gives results far superior to a Bowden wire.

Finally, while I have illustrated and described the power transmitting means as extending inside of the conduit or hose, it is obvious that the invention is not so limited, since either a Bowden wire or the flexible tube 83 may extend along the outside of the hose and be fastened thereto by clips 94 at intervals, as shown in Fig. 11. In any event, it will be seen that I have provided a power transmitting element co-extensive with the hose, for controlling the nozzle valve by the operation of the metering device.

What I claim is:—

1. In a liquid dispensing apparatus, the combination with a tank containing liquid held under pressure, of a discharge conduit connected at one end with said tank, through which conduit liquid is forced by said pressure, a delivery nozzle at the other end of said conduit, a valve at said nozzle for controlling the same, manual means adjacent the nozzle for opening said valve, and automatic means, located at the end of said conduit remote from said nozzle and between said nozzle and tank, for closing said valve after the delivery of a predetermined amount of liquid.

2. In a liquid dispensing apparatus, the combination with a closed tank containing liquid held under fluid pressure, of a discharge conduit connected at one end with said tank, through which conduit liquid is forced by said pressure, a delivery nozzle at the other end of said conduit, a valve at said nozzle for controlling the same, manual means adjacent the nozzle for opening said valve, and automatic means for closing said valve after a predetermined amount of liquid has passed through, said automatic means being located at a point remote from said nozzle, and an operative connection between said automatic means and valve extending through said conduit.

3. In a liquid dispensing apparatus, the combination with a tank containing liquid held under pressure, of a flexible hose connected at one end with said tank for conveying liquid therefrom, a delivery nozzle at the other end of said hose and capable of free universal movement relative to the tank, a valve at said nozzle for controlling the same, manual means for opening said valve, and automatic means located adjacent the first mentioned end of said hose for closing said valve after the delivery of a predetermined amount of liquid.

4. In a liquid dispensing apparatus, the combination with a closed tank containing liquid held under fluid pressure, of a flexible hose connected at one end with said tank for conveying liquid therefrom, a delivery nozzle at the other end of said hose, a valve at said nozzle for controlling the same, manual means for opening said valve, and automatic means located adjacent the first mentioned end of said hose and comprising a flexible power transmitting element extending through the same, for closing said valve.

5. In a liquid dispensing apparatus, the combination with a closed tank containing liquid held under fluid pressure, of a flexible hose connected at one end with said tank for conveying liquid therefrom, a delivery nozzle at the other end of said hose, a valve at said nozzle for controlling the same, a spring tending to close said valve, manual operating means for holding said valve open, and means, comprising a power transmitting element extending through the hose, for disconnecting said manual operating means and permitting said spring to close the valve.

6. In a liquid dispensing apparatus, the combination with a closed tank containing liquid held under fluid pressure, of a flexible hose connected at one end with said tank for conveying liquid therefrom, a delivery nozzle at the other end of said hose, a valve at said nozzle for controlling the same, a spring tending to close said valve, manual operating means for holding said valve open, and means for transmitting through the interior of said hose a fluid pressure impulse and for causing such impulse to disconnect said manual operating means and permit said spring to close the valve.

7. In a liquid dispensing apparatus, the combination with a tank containing liquid held under pressure, of a flexible hose connected at one end with said tank for conveying liquid therefrom, a delivery nozzle at the other end of said hose, a valve at said nozzle for controlling the same, manual means for opening said valve, means tending to close said valve, means for restraining said closing means, and automatic, fluid pressure means for releasing said restraining means and permitting said valve to close after the delivery of a predetermined amount of liquid.

8. In a liquid dispensing apparatus, the combination with a tank containing liquid held under pressure, of a flexible hose connected at one end with said tank for conveying liquid therefrom, a delivery nozzle at the other end of said hose, a valve at said nozzle for controlling the same, manual means for opening said valve, and automatic, fluid pressure controlled means for closing said valve, said means including operating mechanism located adjacent the first mentioned end of said hose, and a flexible conduit connected with said mechanism and co-extensive with said hose.

9. In a liquid dispensing apparatus, the combination with a tank containing liquid held under pressure, of a discharge conduit connected at one end with said tank, through which conduit liquid is forced by said pressure, a valve at the other end of said conduit, manual means for opening said valve, and automatic fluid pressure controlled means for closing said valve.

10. In a liquid dispensing apparatus, the combination with a closed tank containing liquid held under fluid pressure, a metering device connected with said tank and a discharge conduit extending from said metering device, whereby liquid is forced through said metering device and conduit by said pressure, a valve at the free end of said conduit for governing the flow of liquid therethrough, and means actuated by said metering device for controlling said valve.

11. In a liquid dispensing apparatus, the combination with a closed tank containing liquid held under fluid pressure, a metering device connected with said tank and a discharge conduit extending from said metering device, whereby liquid is forced through said metering device and conduit by said pressure, a valve at the free end of said conduit for controlling the flow of liquid therethrough, manual means for opening said valve, and means actuated by said metering device for automatically closing said valve after a predetermined amount of liquid has passed through.

12. In a liquid dispensing apparatus, the combination with a conduit, of a metering device at one end and a delivery nozzle at the other, means for forcing liquid through said metering device, conduit and nozzle, a valve at said nozzle, manual means for opening said valve, and means operated by said metering device for closing said valve, said means including a flexible element.

13. In a liquid dispensing apparatus, the combination with a conduit, of a metering device at one end and a delivery nozzle at the other, means for forcing liquid through said metering device, conduit and nozzle, a valve at said nozzle, manual means for opening said valve, and means operated by said metering device and extending through said conduit for closing said valve.

14. In a liquid dispensing apparatus, the combination with a flexible hose, of a metering device at one end and a delivery nozzle at the other, means for forcing liquid through said metering device, hose and nozzle, a valve at said nozzle, manual means for opening said valve, and means operated by said metering device for closing said valve, said means comprising a flexible element extending longitudinally of said hose and movable therewith.

15. In a liquid dispensing apparatus, the combination with a flexible hose, of a metering device at one end and a delivery nozzle at the other, means for forcing liquid through said metering device, hose and nozzle, a valve at said nozzle, manual means for opening said valve, and fluid pressure means operated by said metering device for closing said valve, said means comprising a flexible conduit separate from said hose but co-extensive therewith.

16. In a liquid dispensing apparatus, the combination with a conduit, of a metering device at one end and a delivery nozzle at the other, said metering device having a reciprocating part, means for forcing liquid through said metering device, conduit and nozzle and thus causing said part to reciprocate, a valve at said nozzle for controlling the same, and means for transmitting from said metering device to said nozzle power generated by said reciprocating part and causing such power to operate said valve.

17. In a liquid dispensing apparatus, the combination with a conduit, of a metering device at one end and a delivery nozzle at the other, said metering device having a reciprocating part, means for forcing liquid through said metering device, conduit and nozzle and thus causing said part to reciprocate, a valve at said nozzle for controlling the same, and means for transmitting from said metering device to said nozzle a power impulse of fluid pressure generated by said reciprocating part at a certain point in its cycle of movement, and for causing such power impulse to operate said valve.

18. In a liquid dispensing apparatus, the combination with a conduit, of a metering device at one end and a delivery nozzle at the other, said metering device having a reciprocating part, means for forcing liquid through said metering device, conduit and nozzle and thus causing said part to reciprocate, a valve at said nozzle for controlling the same, and means for transforming a portion of the movement of said reciprocating part into a fluid pressure power impulse, transmitting such impulse to said nozzle, and causing the impulse thus transmitted to operate said valve.

19. In a liquid dispensing apparatus, the combination with a conduit, of a metering device at one end and a delivery nozzle at the other, said metering device having a reciprocating part, means for forcing liquid through said metering device, conduit and nozzle and thus causing said part to reciprocate, a valve at said nozzle for controlling the same, a spring tending to close said valve, manually operated actuating means for forcing said valve open, and means for transmitting a portion of the movement of said reciprocating part at a certain point in its cycle to said actuating means to disconnect the same and permit the spring to close said valve.

20. In a liquid dispensing apparatus, the combination with a conduit and means for forcing liquid therethrough, of a metering device at one end of said conduit, a delivery nozzle at the other end of said conduit, said nozzle having a discharge port, a spring pressed valve normally closing said port, and located between the same and said metering device, manually operating means for opening said valve, said means comprising a disconnectible catch, and automatic means, operated by said metering device, for disconnecting said catch and permitting said valve to close.

21. In a liquid dispensing apparatus, the combination with a conduit and means for forcing liquid therethrough, of a delivery nozzle at the end of said conduit, said nozzle having a discharge port, a spring pressed valve normally closing said port, manual operating means for opening said valve, said means comprising a disconnectible catch, automatic means governed by the flow of liquid through said conduit, for disconnecting said catch, and permitting said valve to close, and additional manual means for restoring said catch to operative connection with said valve.

22. In an apparatus for dispensing liquids under pressure, a metering device of the closed expansible chamber type having inlet and exit passages, a flexible delivery hose connected with the exit passage, and means for mounting and wholly supporting said device directly upon and above a tank containing the liquid under pressure to be dispensed, said means comprising a coupling device adapted to detachably connect and disconnect the inlet of said metering device and the outlet of said tank.

23. In an apparatus for dispensing liquids under pressure, a metering device comprising a central block having a plurality of ports therein, inlet and exit pipes communicating with said ports, a measuring chamber at each side of said block, a pair of connected pistons reciprocable in said chambers, and a valve mounted in said block and operated by said pistons.

24. In an apparatus for dispensing liquids under pressure, a metering device comprising an elongated cylindrical body made up of a central block and a pair of alined shells secured thereto, inlet and exhaust connections carried by said block, a pair of open ended inner cylinders disposed one at each side of said block, a pair of pistons reciprocable in said inner cylinders, the latter being spaced from said shells to provide annular passages through which liquid may flow from said inlet connection, and a valve in said block controlling said passages.

25. In a liquid dispensing apparatus, the combination with a conduit, of a metering device at one end and a delivery nozzle at the other, means for forcing liquid through said metering device, conduit and nozzle, a pressure responsive device adjacent said nozzle, means actuated by said metering device for generating a fluid pressure impulse when a predetermined amount of liquid has passed therethrough, and means for causing such impulse to actuate said pressure responsive device.

26. In apparatus for dispensing liquids under pressure, a metering device through which the liquid flows, said metering device having a part reciprocated by the flow of the liquid, a conduit extending from said metering device, and means operated by said reciprocating part at a certain point in its stroke for forcing a portion of said liquid under increased pressure into said conduit.

27. In apparatus for dispensing liquids under pressure, a metering device through which the liquid flows, said metering device having a part reciprocated by the flow of the liquid, a conduit extending from said metering device, a chamber communicating with said conduit, and means whereby a portion of the liquid is trapped in said chamber by said reciprocating part at a certain point in its stroke, and forced out through said conduit.

28. In apparatus for dispensing liquids under pressure, a metering device through which the liquid flows, said metering device having a part reciprocated by the flow of the liquid, a conduit extending from said metering device, and means whereby a power impulse is generated by said reciprocating part at a certain point in its stroke, and transmitted out through said conduit.

29. In an apparatus for dispensing liquids under pressure, a metering device comprising a central block on which the device is supported, said block having inlet and outlet passages, measuring chambers disposed one at each side of said block, a pair of pistons reciprocable in said chambers, and a sliding valve mounted in said block and operated by said pistons for controlling the flow of liquid into and out of said chambers.

30. In an apparatus for dispensing liquids under pressure, a metering device comprising a central block on which the device is supported, said block having inlet and outlet passages, measuring chambers disposed one at each side of said block, a sliding valve mounted in said block for controlling the flow of liquid, a pressure chamber, and means whereby a portion of the liquid is trapped in said pressure chamber by said valve and ejected therefrom under relatively high pressure.

31. In a liquid dispensing apparatus, the combination with a tank containing liquid held under pressure, of a conduit connected at one end with said tank for conveying liquid therefrom, a delivery nozzle at the other end of said conduit, a valve at said nozzle for controlling the same, said valve being biased to closed position, means for opening said valve and holding it open, and means for transmitting through the interior of said conduit a power impulse, and for causing such impulse to release said holding means and permit said valve to close.

32. In a liquid dispensing apparatus, the combination with a tank containing liquid held under pressure, of a flexible hose connected at one end with said tank for conveying liquid therefrom, a delivery nozzle at the other end of said hose, a valve at said nozzle, means for opening said valve, and automatic means controlled by fluid pressure transmitted along said hose for closing said valve after the delivery of a predetermined amount of liquid.

33. In a liquid dispensing apparatus, the combination with a liquid conduit, of a delivery nozzle at the end thereof, a reciprocating valve at said nozzle for controlling the same, and biased to closed position, a latch engaging said valve, manually actuated means, operating through said latch, for opening said valve and holding it open, and automatic means for disconnecting said latch from said valve and permitting it to close.

34. In a liquid dispensing apparatus, the combination with a conduit, of a metering device at one end and a delivery nozzle at the other, said metering device having a liquid actuated reciprocating part, means for forcing liquid through said metering device, conduit and nozzle and thus causing said part to reciprocate, a valve at said nozzle for controlling the same, means tending to close said valve, means for opening said valve and holding it open, and means for transmitting a portion of the movement of said reciprocating part at a certain point in its cycle to said holding means to release the same and permit said valve to close.

35. In a liquid dispensing apparatus, the combination with a flexible hose and means for forcing liquid therethrough, of a delivery nozzle carried at the free end of said hose, a valve at said nozzle for controlling the same, said valve being biased to closed position, manually actuated mechanism, detachably connected with said valve, for opening the same and holding it open, and automatic means operating through said hose, for disconnecting said valve from said mechanism and permitting it to close.

36. In liquid dispensing apparatus, the combination with a closed tank containing liquid held under fluid pressure, of a flexible delivery hose connected at one end with said tank for conveying liquid therefrom, a delivery nozzle at the other end of said hose, a valve controlling the flow of liquid from said nozzle, a flexible power transmitting element extending through the inside of said hose, and means for transmitting a power impulse through said element to operate said valve.

37. In liquid dispensing apparatus, the combination with a closed tank containing liquid held under fluid pressure, of a flexible delivery hose connected at one end with said tank for conveying liquid therefrom, a delivery nozzle at the other end of said hose, a valve controlling the flow of liquid from said tank, a flexible control conduit extending through the inside of said hose, and means other than a solid mechanically movable element for transmitting a power impulse through said conduit to operate said valve.

38. In liquid dispensing apparatus, the combination with a closed tank containing liquid held under fluid pressure, of a flexible delivery hose connected at one end with said tank for conveying liquid therefrom, a delivery nozzle at the outer end of said hose, a valve governing the discharge of liquid through said hose and a flexible, power-transmitting control conduit extending through the inside of said hose to operate said valve.

JOHN F. WERDER.